June 23, 1942.   C. E. COCHRAN   2,287,469
INDUSTRIAL TRUCK
Filed April 9, 1941   2 Sheets-Sheet 1

INVENTOR.
Clyde E. Cochran
BY Fay, Macklin, Golrick and Williams
ATTORNEYS.

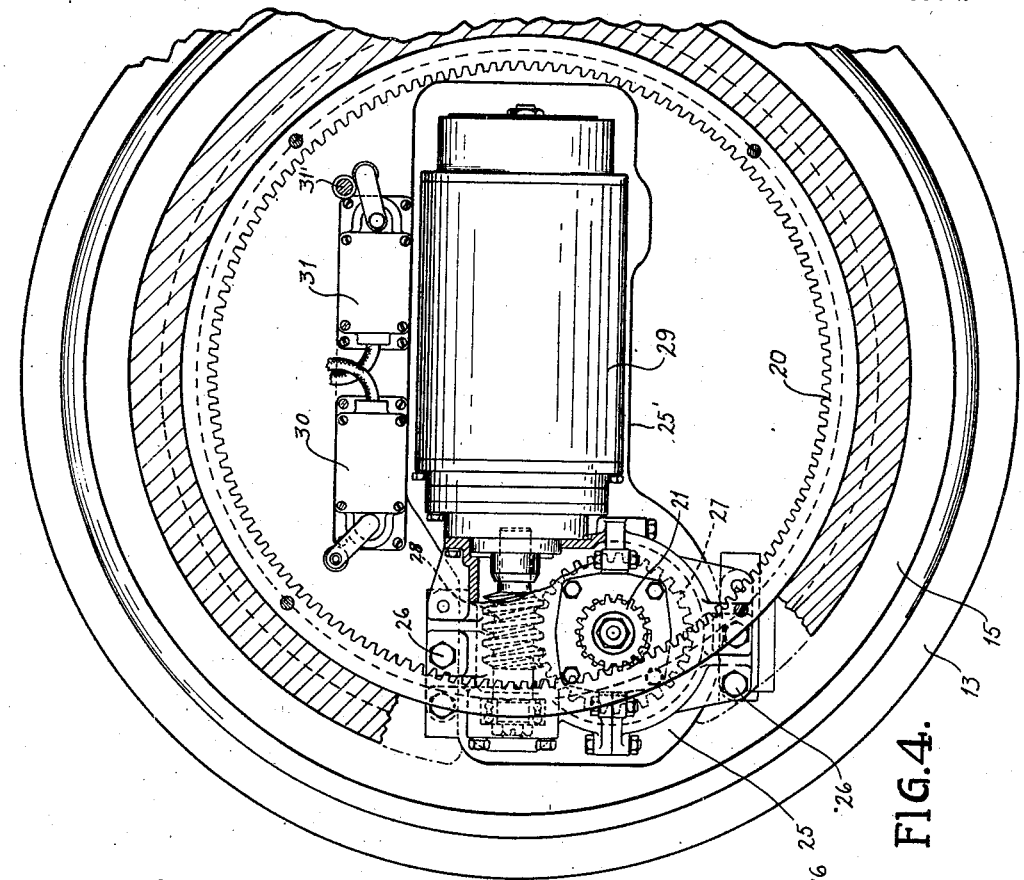
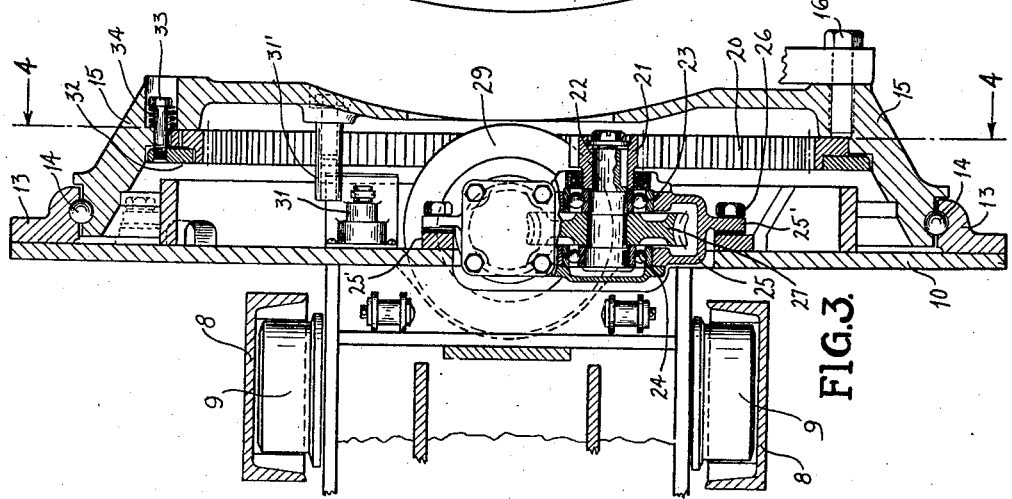

Patented June 23, 1942

2,287,469

UNITED STATES PATENT OFFICE 2,287,469

INDUSTRIAL TRUCK

Clyde E. Cochran, Cleveland, Ohio, assignor to The Elwell-Parker Electric Company Application April 9, 1941, Serial No. 387,622

9 Claims. (Cl. 214—121)

This invention relates, as indicated, to an industrial truck, but has reference more particularly to the load elevating mechanism of such trucks and to a novel load rotating device used in connection with such load elevating mechanism.

In industrial trucks of either the non-telescoping or telescoping variety, it has heretofore been proposed to provide a load rotating device adapted to up-end a load which would normally occupy too much space in a direction transversely of the load. In such cases, however, it has been customary to provide a separate motor for rotating the load, but such motor was invariably placed in a position on the truck in which it obstructed the view alongside the truck or constituted an element which might encounter obstructions during operation of the truck. It has also been virtually impossible, in such cases, to provide limit switches for the purpose of controlling the extent of rotation of the rotating device, and it was the usual practice to permit the rotated element to strike against stops provided for this purpose, which permitted the slidable clutch in the unit to slip until such time when the operator decided to shut off the current supply to the motor. These expedients proved highly unsatisfactory.

It is a primary object of the present invention to provide an industrial truck embodying load rotating mechanism which is free from the aforesaid disadvantages, and in which the load rotating mechanism is extremely compact and concealed from view and the possibility of injury thereto substantially obviated.

A further object of the invention is to provide a truck of the character described, in which suitable limit switches are provided in a location wherein they are protected as well as concealed from view.

To the accomplishment of the foregoing and related ends, said invention, then, consists of the means hereinafter fully described and particularly pointed out in the claims; the annexed drawings and the following description setting forth in detail certain structure embodying the invention, such disclosed structure constituting, however, but one of various structural forms in which the principle of the invention may be used.

In said annexed drawings:

Fig. 3 is a fragmentary cross-section, on an enlarged scale, taken on the line 3—3 of Fig. 2; and Fig. 4 is a cross-sectional view, taken on the line 4—4 of Fig. 3.

Figure 1:
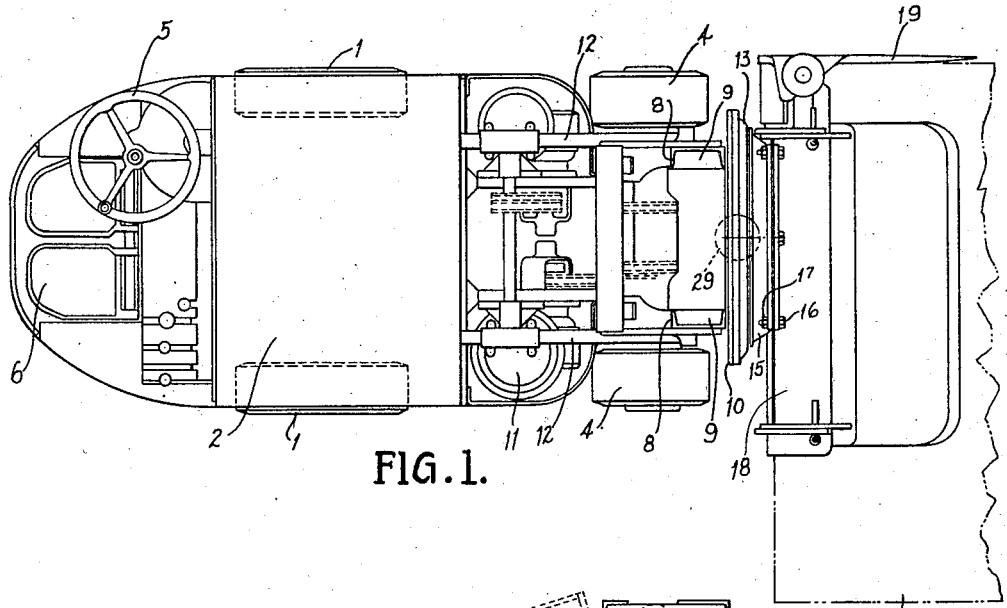
Fig. 1 is a plan view of an industrial truck embodying the invention.

Referring more particularly to the drawings, the truck is provided at one end with a pair of dirigible wheels 1 disposed beneath a housing 2, within which is disposed a power plant for driving the wheels 1. The wheels 1 as well as the non-driven or trail wheels 4, are adapted to be steered by means of a steering wheel 5 accessible to an operator standing on the platform 6 of the truck.

Figure 2:
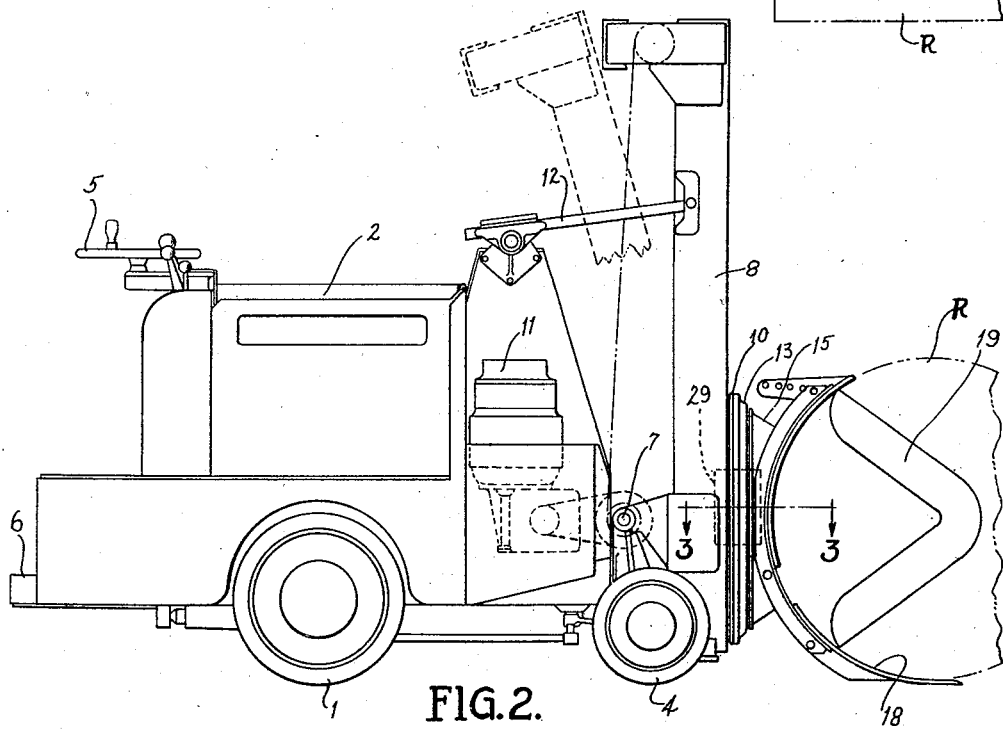
Fig. 2 is a side elevation of the truck.

At the forward end of the truck is an upright frame, which is mounted for pivotal movement about a horizontal axis 7, the frame comprising a pair of channels 8, which form tracks or guides for the rollers 9 of a load elevator 10. This load elevator is adapted to be raised and lowered by any suitable chain or other mechanism driven by an electric motor 11, and the frame comprising the channels 8 may be tilted about the axis 7 whenever desired, as indicated by the dotted lines in Fig. 2, suitable mechanism, which forms no part of the present invention, being provided for this purpose, such mechanism acting to reciprocate racks 12 which are pivotally connected to the channels.

The aforesaid described truck is of more or less conventional construction, and the only purpose in describing the same is to indicate the type of truck in connection with which the general features of the invention, now about to be described, are used.

The load elevator 10 has secured thereto an annular member 13, which forms an outer race for bearing balls 14, the inner race for which is formed by a circular housing member or turntable 15. The member 15 has secured thereto, as by means of bolts 16, and nuts 17, a load supporting device, which, in this instance is illustrated as a roll paper apron consisting of a scoop 18 for picking up and supporting a roll R of news print or the like, and an end stop 19 for the roll.

For the purpose of rotating the turntable 15 about its axis so as to enable the truck to move the roll R about in an up-ended position, supported on the end stop 19, and thereby enable the truck to be moved through relatively narrow aisles without danger of the roll meeting obstructions, mechanism is provided which is clearly shown in Figs. 3 and 4.

Such mechanism, briefly, includes an internal ring gear 20, which is secured to the turntable 15 and a pinion 21 in driving engagement with the ring gear. The pinion 21 is keyed to a stub shaft 22, journaled in ball bearings 23 and 24, disposed in a housing 25, which is secured to a bracket 25' which in turn is secured to the load elevator 10, as by means of bolts 26.

The shaft 22 has keyed thereto a worm gear 27, which is driven by a worm 28, which worm is driven by an electric motor 29. The motor 29 is supported from the bracket 25'.

The motor 29 forms the subject of my co-pending application Serial No. 387,623, filed April 9, 1941, but it may be noted at this point that the motor is disposed entirely within the turntable member 15 and between the upright channels constituting the load elevator frame. This is a distinct improvement over arrangements heretofore used, in which the motor has been disposed outside the upright members of the frame, in which position it obstructed the view alongside the truck and constituted an element which might encounter obstructions during operation of the truck.

The operation of the motor is, of course, controlled by the operator from the platform of the truck, but in order to automatically limit the rotation of the turntable 15, limit switches 30 and 31 are provided, which are suitably mounted on the elevator plate 10 in position to be engaged by a pin 31' on the member 15. These limit switches are so disposed that the current supply to the motor 29 will be automatically cut off by the pin 31' when the unit has been rotated through the desired angle, in this case 90 degrees. These limit switches, it may be noted, are also enclosed within the unit, whereas in earlier constructions, it was virtually impossible to supply suitable limit switches for the purpose of controlling the extent of rotation of the rotating member, it being the usual practice to permit the rotated element to strike against stops provided for this purpose, which permitted the slidable clutch in the unit to slip until such time when the operator decided to shut off the current.

It will be further noted that the ring gear 20 is held in position on the member 15 by means of a friction plate 32, preferably made of bronze, such plate being maintained against the ring gear by means of bolts 33, urged to the right (Fig. 3) by means of springs 34. Should an overload be placed on the load-carrying member on the truck, or should it strike against a movable object, the ring gear will slip relatively to the member 15, and no damage will result.

The operation of the truck will be readily understood from the foregoing description, but will be briefly described at this point for the sake of clarity.

In transporting a newsprint roll, for example, the truck is moved along and the roll R scooped up by means of the scoop 18 of the roll paper apron. The frame comprising the channels 8 is then tilted rearwardly to the position indicated by the dotted lines in Fig. 2, so as to insure that the roll R will not roll off the scoop. Thereafter, the load elevator 10 is elevated sufficiently to permit the turntable member 15 to be rotated approximately 90 degrees, thereby up-ending the roll R and causing it to be supported by the end stop 19. In unloading, these operations are, of course, performed in reverse order. By transporting the roll in this manner, it occupies a minimum of space in a direction transversely of the truck, and enables the truck to be turned around relatively narrow corners and moved in relatively narrow aisles without danger of interference with the operation of the truck or with the load carried thereby.

Although the invention has been shown in connection with a roll paper apron, it will be readily understood that it may be used in connection with numerous other load-carrying devices, such as forks, clamps, etc.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. In an industrial truck, load supporting means, and means for rotating said load supporting means about an axis which extends in the general direction of movement of the truck, said last-named means comprising a hollow rotatable member, a motor substantially disposed within and concealed by said member for rotating said member, gearing interconnecting said motor and rotatable member for rotating the latter.

2. In an industrial truck, load supporting means, and means for rotating said load supporting means, said last-named means comprising a hollow rotatable casting, a ring gear secured to said casting interiorly thereof, a motor partially disposed within said casting and means driven by said motor for driving said ring gear.

3. In an industrial truck, a load-elevating member, a load-supporting member rotatable with respect to said load-elevating member, means comprising an electric motor for rotating said load-supporting member, said motor being supported by said load-elevating member and being substantially concealed from view by said load-supporting member.

4. In an industrial truck, in combination, an upright frame, means for pivotally moving said frame relatively to said truck, a load-elevating member movable along said frame, a load-supporting member rotatably mounted on said load-elevating member, and means substantially concealed from view within said frame and members for rotating said load-supporting member.

5. In an industrial truck, load-supporting means, means for rotating said load-supporting means about an axis which extends in the general direction of movement of the truck, said last-named means comprising a hollow rotatable member, a motor substantially disposed within and concealed by said member for rotating said member, and means within said member for automatically limiting the extent of rotation of said load-supporting means.

6. In an industrial truck, a load-elevating member, a load-supporting member rotatable with respect to said load-elevating member, means comprising an electric motor for rotating said load-supporting member, said motor being supported by said load-elevating member and being substantially concealed from view by said load-supporting member, and limit switches supported by said load-elevating member for breaking the current supply to said motor after said load-supporting member has been rotated a predetermined amount.

7. In an industrial truck, in combination, an upright frame, means for pivotally moving said frame relatively to said truck, a load elevating member movable along said frame, a load-supporting member rotatably mounted on said load-elevating member, means comprising an electric motor substantially concealed within said frame and members for vertically rotating said load-supporting member, and limit switches mounted on said load elevating member for controlling the current supply to said rotating means.

8. In an industrial truck, a load elevating member, a load supporting member rotatable with respect to said load elevating member, a friction plate mounted on said load supporting member, a ring gear disposed between said load supporting member and said friction plate, and means mounted on said load elevating member for driving said ring gear.

9. In an industrial truck, load supporting means, a friction plate mounted on said load supporting means, a ring gear disposed between said load supporting means and said friction plate, means for rotating said load supporting means, said means concealed from view exteriorly of said truck, and means for automatically limiting the extent of rotation of said load supporting means.

CLYDE E. COCHRAN.